(12) United States Patent
Radulescu et al.

(10) Patent No.: US 8,578,223 B2
(45) Date of Patent: Nov. 5, 2013

(54) METHOD AND APPARATUS OF MANAGING RETRANSMISSIONS IN A WIRELESS COMMUNICATION NETWORK

(75) Inventors: Andrei Radulescu, Eindhoven (NL); David R. Evoy, Chandler, AZ (US)

(73) Assignee: ST-Ericsson SA, Plan-les-Ouates (CH)

( * ) Notice: Subject to any disclaimer, the term of this patent is extended or adjusted under 35 U.S.C. 154(b) by 947 days.

(21) Appl. No.: 12/449,442

(22) PCT Filed: Jan. 31, 2008

(86) PCT No.: PCT/IB2008/050372
§ 371 (c)(1),
(2), (4) Date: Dec. 4, 2009

(87) PCT Pub. No.: WO2008/096304
PCT Pub. Date: Aug. 14, 2008

(65) Prior Publication Data
US 2010/0107008 A1  Apr. 29, 2010

(30) Foreign Application Priority Data
Feb. 9, 2007  (EP) .................................... 07102084

(51) Int. Cl.
*G11C 29/00*  (2006.01)

(52) U.S. Cl.
USPC ............................ 714/718; 714/722; 714/753

(58) Field of Classification Search
USPC ........... 714/718, 722, 755, 753, 730, 799, 49, 714/57
See application file for complete search history.

(56) References Cited

U.S. PATENT DOCUMENTS

| | | | |
|---|---|---|---|
| 6,275,471 B1 | 8/2001 | Bushmitch et al. | |
| 6,683,850 B1 | 1/2004 | Dunning et al. | |
| 7,274,730 B2 * | 9/2007 | Nakabayashi | 375/220 |
| 7,860,992 B2 * | 12/2010 | Robinson | 709/231 |
| 2001/0055313 A1 | 12/2001 | Yin et al. | |
| 2002/0019965 A1 | 2/2002 | Bims et al. | |
| 2002/0102942 A1 | 8/2002 | Taori et al. | |
| 2002/0138790 A1 | 9/2002 | Nishtala | |
| 2005/0147042 A1 | 7/2005 | Purnadi et al. | |

FOREIGN PATENT DOCUMENTS

WO    WO 01/22646 A1    3/2001

OTHER PUBLICATIONS

International Search Report dated Oct. 15, 2008 in connection with PCT Patent Application No. PCT/IB2008/050372.

* cited by examiner

*Primary Examiner* — Fritz Alphonse
(74) *Attorney, Agent, or Firm* — Coats & Bennett, P.L.L.C

(57) ABSTRACT

A method for transmitting data is described that includes the steps of: Producing a data frame for transmission, the data frame including a sequence number and user data, saving a copy of the data frame in a retransmission buffer, and if said step of saving a copy requires that data already present in the retransmission buffer is overwritten, selecting the one or more oldest data frames in the retransmission buffer to be overwritten, in case an error is determined in the received data frame, communicating an error message to the transmitter of the data frame, which error message at least comprises an indication of the sequence number of the last correctly received data frame,—upon receipt of such message and if available, retransmitting one or more data frames from the retransmission buffer having a sequence number higher than the sequence number communicated in the message.

19 Claims, 10 Drawing Sheets

METHOD AND APPARATUS OF MANAGING RETRANSMISSIONS IN A WIRELESS COMMUNICATION NETWORK

CROSS-REFERENCE TO RELATED APPLICATION(S)

The present application claims priority under 35 U.S.C. §365 to International Patent Application No. PCT/IB2008/050372 filed Jan. 31, 2008, entitled "TRANSMISSION METHOD, TRANSMITTER AND DATA PROCESSING SYSTEM COMPRISING A TRANSMITTER". International Patent Application No. PCT/IB2008/050372 claims priority under 35 U.S.C. §365 and/or 35 U.S.C. §119(a) to European Patent Application No. 07102084.6 filed Feb. 9, 2007 and which are incorporated herein by reference into the present disclosure as if fully set forth herein.

FIELD OF THE INVENTION

The invention relates to a method for transmitting data frames.

The invention relates to a transmitter for transmitting data frames.

The invention still further relates to a data processing system comprising a transmitter.

BACKGROUND OF THE INVENTION

Data processing systems are more and more designed using a plurality of building blocks that communicate to each other via data links using a standardized protocol. Errors may occur in the communication. In particular a mobile phone is a noisy environment. The expected bit error rates are in the order of $10^{-12}$ which translates into one error every 15-20 minutes. As a result the communication protocol must detect and be able to recover from such errors.

U.S. Pat. No. 6,181,704 describes a method for transmitting data in a network from a transmitter to a receiver. Each of the transmitted data frames is assigned a corresponding sequence number. A copy of each data frame is stored in a buffer at the transmitter until an acknowledgment is received that each data frame was successfully received by the intermediary point. Once a particular data frame is successfully received by the receiver, the particular data frame is acknowledged to the transmitter, and is subsequently de-allocated at the transmitter, as are any other data frames in the buffer between the particular data frame and the previously last acknowledged data frame. Upon receipt of an error indication, the data frame indicated in the error indication is retransmitted along with all subsequent data frames. At the receiving end, all received data frames following the data frame associated with the error indication are dropped until successfully receiving a retransmitted version of the data frame. In addition, a single negative acknowledgment is used to indicate that a data frame associated with the negative acknowledgment includes at least one error and to simultaneously indicate that all previous data frames received prior to the data frame associated with the negative acknowledgment were received correctly.

As the transmitter maintains a copy of the transmitted data frames in its buffer until they are successfully transmitted, it cannot accept new data frames. Accordingly the data stream will be substantially delayed, if the number of errors is (temporarily) high.

It is a purpose of the present invention to provide for a reasonable protection against errors while providing real-time guarantees.

According to embodiments of the present invention only the newest data frames are stored in the retransmission buffer. If a new data frame is produced it overwrites the oldest data frames in as far as necessary. This measure is based on the observation that for a real-time application old data frames are not usable anymore (e.g., modem I/O samples, or video frames). Moreover, these old data frames can delay newer data frames that may still be usable directly after production, but not after a delay.

It is noted that the earlier Application IB2006/054240 filed by the same Applicant describes a data processing system that has a retransmission buffer for temporarily keeping data frames available for retransmission if they are not correctly received the first time. In this earlier filed Application however, the data frames are transmitted in fixed time slots. In the method described in the present application that is not necessary, as the data frames have sequence numbers. Furthermore, the retransmission buffer described in the earlier filed Application stores the data frames for a fixed duration. In the method and transmitter according to the present invention the data frames are kept in the retransmission buffer until it is necessary to overwrite them by a new data frame.

The receiver may acknowledge every correctly received data frame. However, this requires that a return link is maintained permanently activated. On the other hand if acknowledgments are omitted a transmitter cannot discriminate between the situation where an error message was sent, but not received, and the situation where no error message was transmitted.

In one embodiment the transmitter receives as a reminder a further error message if it did not provide a response to the error message sent first. Accordingly, each time the receiver transmits a negative acknowledgement message, it determines whether it receives a response within a predetermined time-limit and/or after counting a predetermined number of further errors. If no response is received before the time limit and/or before the limit in the number of errors, the receiver transmits a second error message. At the side of the transmitter this means that ambiguities are counter-acted, as the transmitter can expect a second error message if it missed an earlier error message and could not respond. Accordingly the use of positive acknowledgement messages becomes superfluous. In particular in case of relatively low error rates this enables a significant reduction of power of the return data link.

If the receiver has received no response to its second error message it may send further messages while waiting a predetermined time for the transmitters' response.

The transmitter may merely indicate that it has received the error message from the receiver. In one embodiment however, the transmitter retransmits the data frame for which it received an error message. In this way the data link from the transmitter to the receiver is used efficiently.

If the receiver does not receive a response to its error message, this may be caused by an out of sync condition of the data link (return data link) from the receiver to the transmitter. One embodiment provides for a resynchronization that overcomes this condition. The resynchronization may take place immediately when an error condition is detected in the verification step. However, taking into account that errors may occur incidentally, the resynchronization of the return data link may alternatively take place when the receiver detects that it has received no response to its first error message. Although resynchronization could be postponed until the second error message or even the further error message does not give a response, this is not preferred as already the absence of a response to the first error message is an indication of a more structural problem.

Likewise the occurrence of an error in a data frame received by the receiver may indicate that the data link from the transmitter to the receiver is in an out of sync condition. A repeated situation wherein the receiver does not receive a response from the transmitter may be due to an out of sync condition of the data link from the transmitter to the receiver. One embodiment overcomes this condition. A resynchronization may be initiated immediately after an error is detected, or may be postponed until it is more likely that the error is caused by an out of sync condition, preferably when sending the second error message.

The receiver may indicate with flow control messages, how many data frames it is prepared to receive. However, taken into account that these messages will load the return data link, in one embodiment the flow control messages are not sent. Although this may occasionally result in a situation where the transmitter sends more data frames than the receiver can handle this need not be a problem. In particular for real-time applications, dropping the non-accepted data frames allows the receiver to receive the remaining data frames without significant delay. In one embodiment those frames for which the receiver has insufficient storage space are dropped. In an embodiment an error message is returned to the transmitter when a data frame is dropped.

Likewise, the power consumption of the return data link can be reduced by avoiding acknowledgement messages from the receiver.

Various alternatives are possible for dropping data frames. A device having a buffer for temporarily storing data frames preferably drops the oldest of the messages stored in its buffer.

In addition to the user data and the sequence number, the data frames preferably have some redundant information to facilitate a verification of the data frames, for example in the form of cyclic redundancy check (CRC) data. The redundant information may be used in addition to correct errors, so that a retransmission is not always necessary. Alternatively errors may be detected for example by the occurrence of data having an out of bound value, or by detecting the occurrence of sequence numbers that are out of order.

In the above description it is presumed that it is the role of the transmitter to transmit data frames to the receiver, while the receiver merely sends error messages if appropriate. However, in an alternative embodiment, the return data link from the receiver to the transmitter may be used to transmit data from the receiver to the transmitter. Also in this embodiment the present invention is favorable, as by avoiding transmission of acknowledgement messages to the transmitter more bandwidth is available for transmission of data frames.

The data link for transmission of the data frames may be implemented in various ways. For example, the data link may be a serial or a parallel link. The data link may itself apply a coding. For example, the data may be transmitted with an embedded clock e.g. using 8b10b encoding. Alternatively data and clock may be transmitted separately.

A transmitter according to the invention is claimed in claim 15.

A data processing system comprising a transmitter is claimed in claim 17.

BRIEF DESCRIPTION OF THE FIGURES

These and other aspects are described in more detail with reference to the drawing. Therein, FIG. 1 schematically shows a data processing system comprising a transmitter and a receiver, FIG. 2 schematically shows an example of a data frame exchanged between the transmitter and the receiver.

DETAILED DESCRIPTION OF EMBODIMENTS

In the following detailed description of the invention, numerous specific details are set forth in order to provide a thorough understanding of the invention. However, the invention may be practiced without these specific details. In other instances well known methods, procedures, and/or components have not been described in detail so as not to unnecessarily obscure aspects of the invention.

Figure 1:
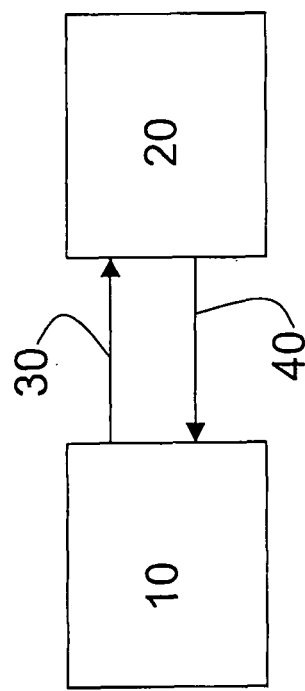

FIG. 1 schematically shows a part of a data processing system, e.g. a system used in a mobile phone comprising a transmitter 10 and a receiver 20. The transmitter 10 may be any data producing device, e.g. a baseband processor, a storage or a camera chip. The receiver 20 may be any data receiving device, e.g. a processor, or another storage. The transmitter 10 transmits data frames to the receiver 20 via data link 30. The receiver 20 can communicate error messages to the transmitter 10 via return data link 40. Although in the embodiment shown the transmitter 10 and the receiver 20 are directly coupled, they may alternatively be coupled via one or more intermediary nodes.

Figure 2:
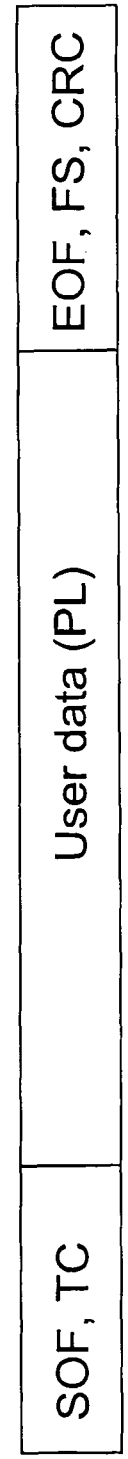

FIG. 2 schematically shows an example of a data frame exchanged between the transmitter and the receiver. The data frames comprise control data as well as user data. The control information serves to control a proper transfer of the user data (payload PL). The control data includes at least a frame sequence number FS, and may further include for example a start of frame SOF marker, an end of frame marker EOF, and a traffic class indicator TC (e.g. indicating high/low priority data traffic, isochronous traffic or best effort traffic). Furthermore redundant data CRC may be present to verify correctness of the user data and/or control data. The frame sequence number FS is shown to be part of the data frame trailer, but it may also be part of the frame header.

Figure 3:
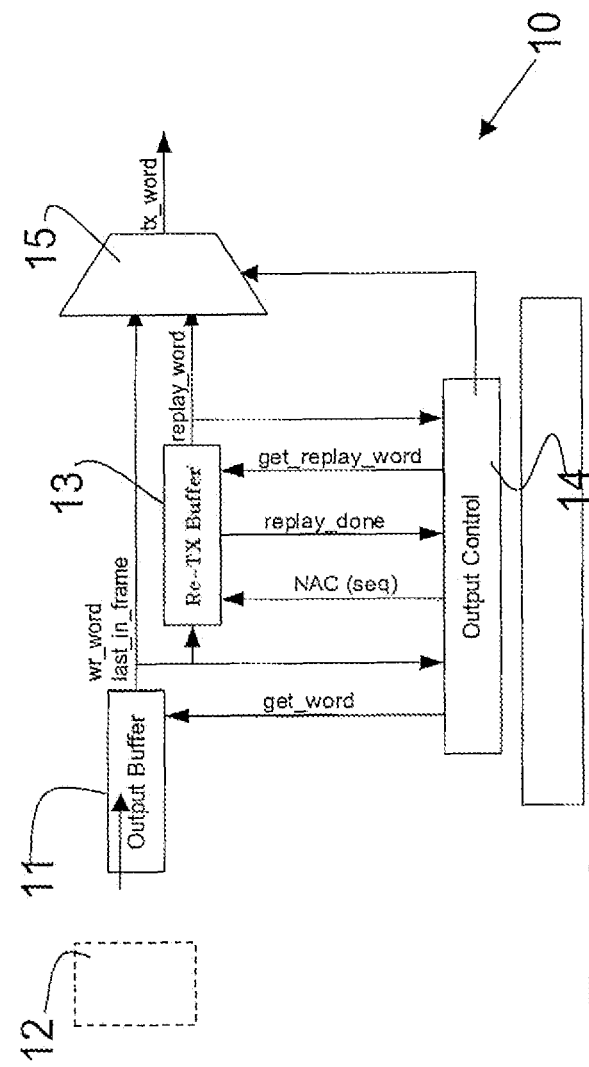
FIG. 3 shows in more detail an embodiment of a transmitter according to the invention.

FIG. 3 shows in more detail a transmitter according to the present invention. The transmitter includes a production module 11 for producing at least one data frame for transmission. The production module 11 may for example be an input buffer that temporarily stores data frames received from an external source 12 as shown dashed in the embodiment of this Figure. Alternatively the production module may for example generate the data frames itself, e.g. from signal provided by a sensor, or antenna. The at least one data frame includes a sequence number, user data and an error-detection code. The transmitter further includes a retransmission buffer 13 for temporarily storing the at least one data frame. A controller 14 configures the retransmission buffer 13 for retransmission and selects which of the production module 11 and the retransmission buffer 13 is used for supplying the data frames for transmission. The outputs of the production module 11 and of the retransmission buffer 13 are coupled to a multiplexor 15, controlled by the controller 14 to select one of the outputs for providing a data frame for transmission to the receiver 20.

Figure 4:
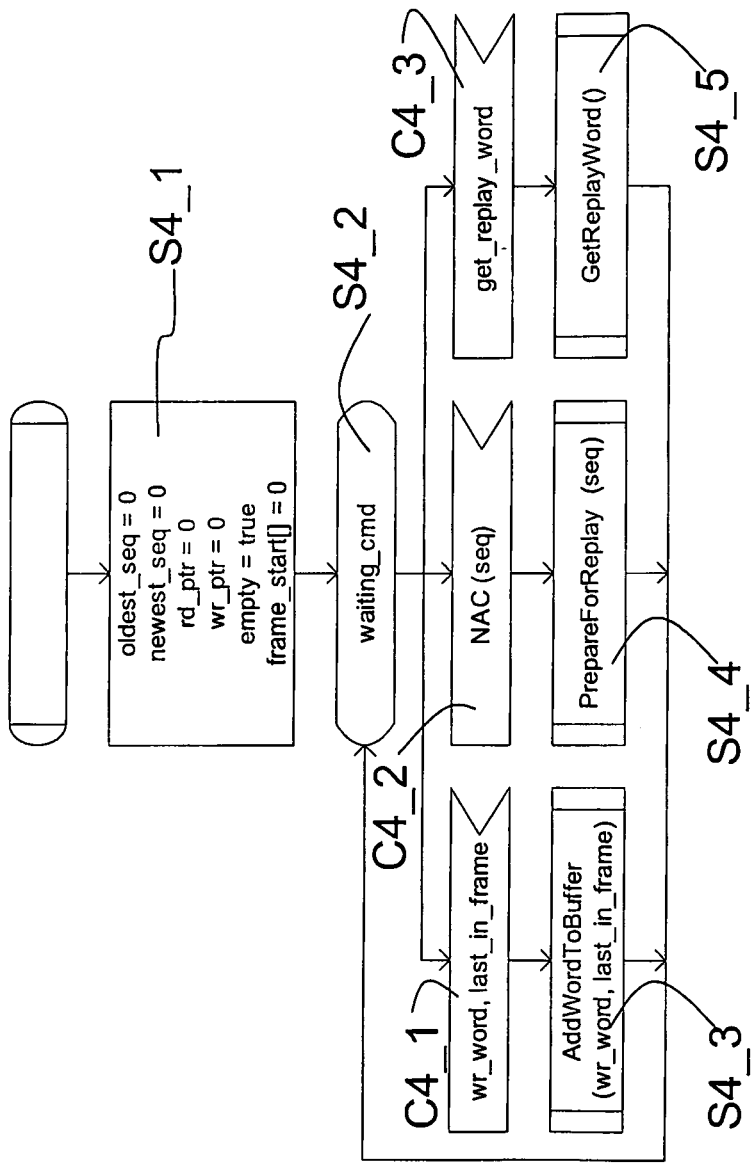
FIG. 4 shows a general overview of the operation of the transmitter.

The operation of the controller 14 is shown in more detail in FIG. 4. At startup (Step S4_1) the controller initializes the following variables:
oldest_seq=0
newest_seq=0
rd_ptr=0
wr_ptr=0
empty=true
frame_start[ ]=0

Therein the variables oldest_seq and newest_seq respectively indicate the sequence number of the oldest data frame and the newest data frame in the retransmission buffer. The variables rd_ptr and wr_ptr respectively indicate the retransmission buffer locations that are currently read from and written to. The variable empty indicates whether data frames are available in the retransmission buffer. Frame_start[ ] is a table comprising for each data frame x the location of the first word of said data frame in the retransmission buffer 13.

In step S4_2 the controller waits for one of the following conditions to occur:
  A new word of a data frame becomes available for transmission (C4_1). In that case the data frame is added to the retransmission buffer in action S4_3. This action is described in more detail with reference to FIGS. 5A and 5B.
  An error message (NAC) is received (C4_2) that indicates the sequence number seq of the last correctly received data frame. In that case all the data frames up to and including the reported frame sequence number seq are discarded, and the retransmission buffer read pointer is moved at the beginning of the first unacknowledged data frame in action S4_4. This action is described in more detail with reference to FIG. 6.
  The event get_replay_word is received during a replay (C4_3). This results in receiving a word from the retransmission buffer 13. When all the data from the retransmission buffer 13 has been resent, a flag is set. This action C4_3 is described in more detail in FIG. 7.

Figure 5:
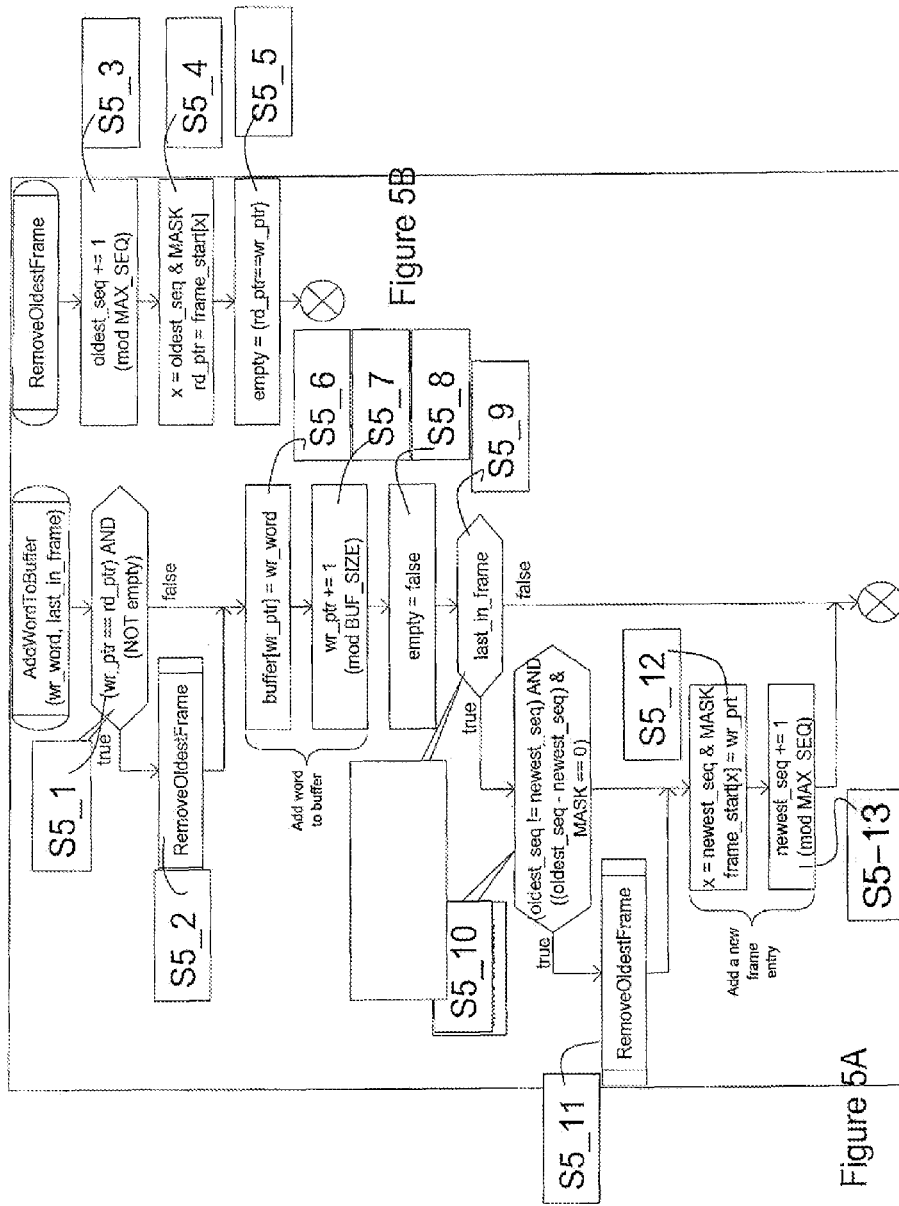
FIGS. 5A and 5B show in more detail the steps taken to add new data to the retransmission buffer.

FIGS. 5A and 5B are described now in more detail. In the embodiment shown data frames can comprise a variable number of words, and the production module 11 indicates the last word by a flag last_in_frame. The data frames are added word by word wr_word to the retransmission buffer 13.

First, in step S5_1 it is verified whether the retransmission buffer 13 is full. The retransmission buffer 13 is full if the value of the write pointer wr_ptr is equal to the value of the read pointer rd_ptr and the flag empty is false. If indeed the retransmission buffer 13 is full, the oldest data frame in the retransmission buffer is therefore removed in action S5_2. This action, which is illustrated in more detail in FIG. 5B, includes steps S5_3, S5_4, S5_5. In step S5_3 the index indicating the oldest data frame in the retransmission buffer 13 is incremented:
oldest_seq=(oldest_seq+1) mod MAX_SEQ
Therein MAX_SEQ is the maximum number of data frames.

In step S5_4 the read pointer is updated:
x=oldest_seq & MASK
rd_ptr=frame_start [x]
This pointer rd_ptr addresses the first word of this new oldest data frame in the retransmission buffer 13.

After the read pointer is updated it is verified in step S5_5 whether removing the data frame resulted in an empty retransmission buffer 13. This is the case if the read pointer equals the write pointer:
empty=(rd_ptr==wr_ptr)

The full-buffer test S5_1 may be repeated. This may for example be necessary if a new data frame is larger than the oldest data frame stored in the retransmission buffer 13.

After the full-buffer test S5_1 and the possible oldest-frame removal S5_2, the word to be, written wr_word is inserted in the retransmission buffer at the wr_ptr position in step S5_6, the wr_ptr pointer is incremented to the next retransmission buffer location in step S5_7, and the empty flag is set to false in step S5_8, because at least the current word wr_word is in the retransmission buffer 13.

In step S5_9 it is determined whether a new data frame has been completely stored in the retransmission buffer 13, by inspecting the value of the flag last_word_in_frame provided by the production module 11.

If it is determined in step S5_9 that a new data frame has been completely stored in the retransmission buffer 13 it is also necessary to update information about the start of the next data frame. The number of data frame entries is limited. Accordingly in step S5_10 it is verified whether all numbers are in use. In this particular example, the least significant bits of the sequence number are used to identify a data frame in the retransmission buffer 13. E.g., if there are 8 bits used for the sequence number, the least significant 4 bits can be used to maintain 16 data frame entries.

The following test reveals whether a data frame entry is in use:
(oldest_seq!=newest_seq) AND ((oldest_seq−newest_seq) & MASK==0)

If this is the case, in step S5_11, worked out in FIG. 5B, the oldest data frame is removed from the retransmission buffer 13 to make space for the new data frame.

Figure 6:
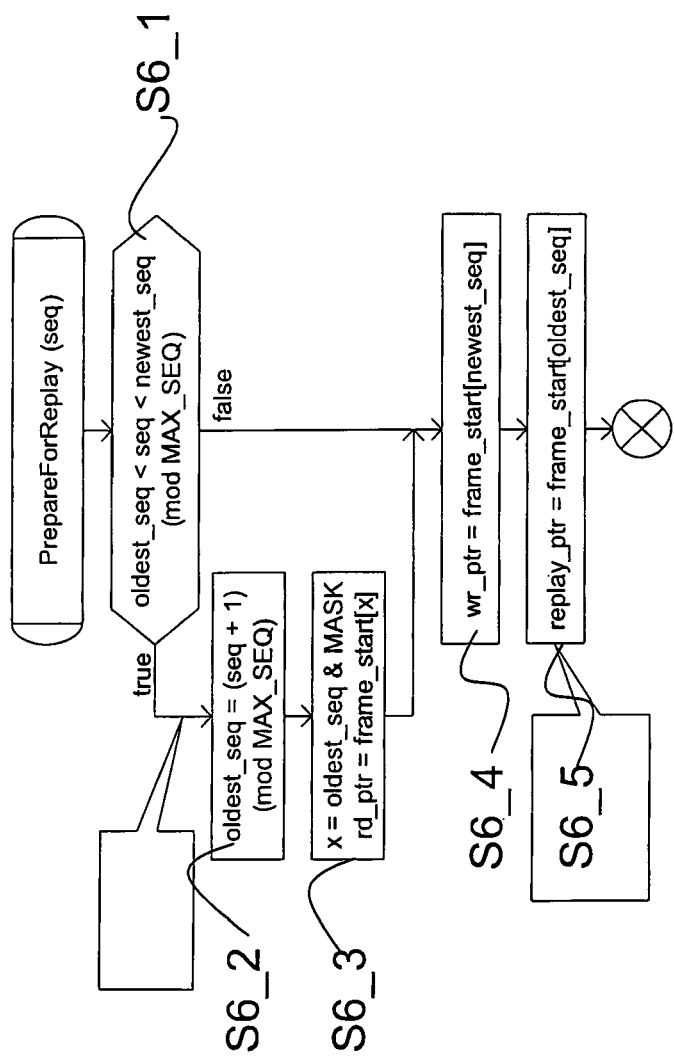
FIG. 6 shows in more detail the steps taken to retransmit data from the retransmission buffer.
Figure 7:
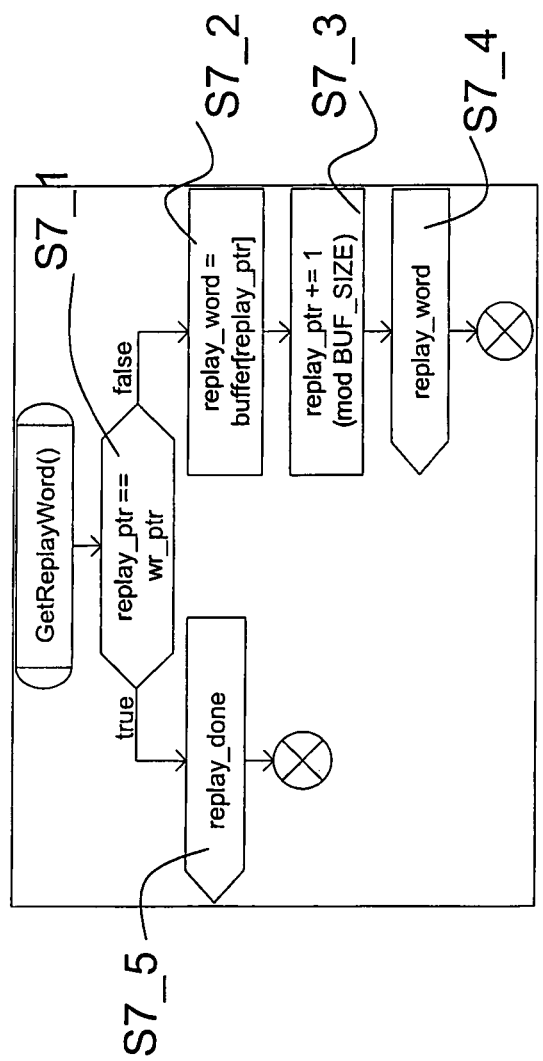
FIG. 7 shows in more detail the steps taken to retransmit data from the retransmission buffer.

The start of the newest data frame is calculated in step S5_12 by:
x=newest_seq & MASK
frame_start[x]=wr_ptr Subsequently the index pointing to the newest data frame is incremented in step S5_13:
newest_seq=(newest_seq+1) mod MAX_SEQ When a negative acknowledge NAC is received, the data transmitter 10 prepares the retransmission buffer 13 for retransmission, as shown in more detail in FIG. 6.

First in step S6_1 it is checked if the reported sequence number seq is actually stored in the retransmission buffer. This is the case if:
oldest_seq≤seq≤newest_seq If so, in step S6_2 all the data frames up to and including the data frame with number seq are removed from the retransmission buffer. Accordingly the variable oldest_seq is updated as:
oldest_seq=(seq+1) mod MAX_SEQ And in step S6_3 the new read pointer is updated as:
x=oldest_seq & MASK
rd_ptr=frame_start[x]

In step S6_4 the currently being transmitted data frame is also removed from the retransmission buffer. Removal is achieved by incrementing the write pointer wr_ptr to the start of the next data frame:

wr_ptr=frame_start[newest_seq]

In step S6_5 the replay pointer is set to the beginning of the oldest data frame:

replay_ptr=frame_start[oldest_seq]

Retransmission continues (see FIG. 7), until the replay pointer is equal to the write pointer. This is verified in step S7_1. Every time a word is requested, this is delivered from the replay_ptr position in the retransmission buffer (step S7_2), and replay_ptr is incremented in step S7_3. Subsequently the replayed word of the frame is transmitted (S7_4).

If all the buffer has been replayed (replay_ptr==wr_ptr), a message is issued in step S7_5 that normal operation mode is assumed again (S4_2, FIG. 4).

Figure 8:
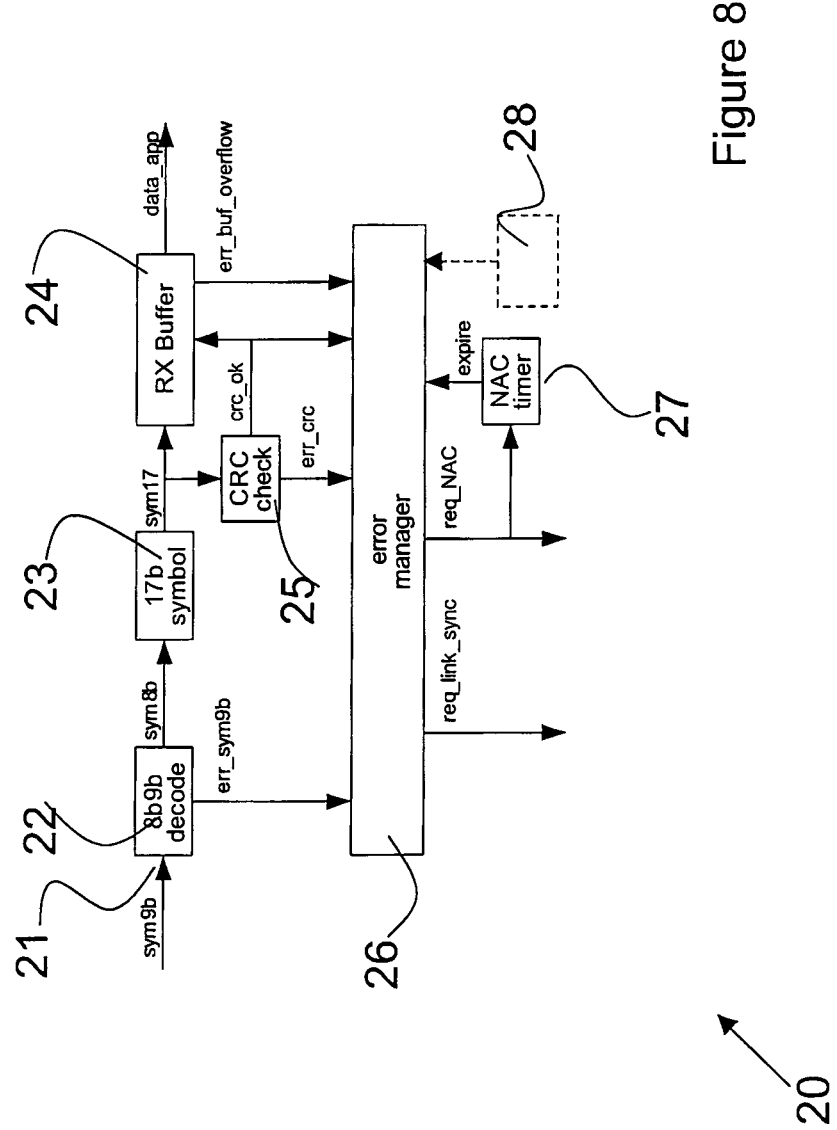
FIG. 8 shows a receiver in a data processing system according to the invention.

FIG. 8 schematically illustrates a receiver 20 of a data processing system according to the invention. The receiver 20 includes an input 21 for receiving the at least one data frame. The input 21 is coupled to a channel decoder module 22 that decodes the data from a 9 bit communication format into an 8 bit internal data format. A next module 23 converts this 8 bit internal data format into data having a further 17 bit internal format. The 17 bit data is supplied to the receive buffer 24 and to a CRC-module 25 that compares the value of the CRC data in the data frame with the value of the CRC data calculated from the user data in the data frame.

The receiver further has an error detection module 26 for detecting an error in the at least one data frame. The error detection module 26 may for example detect the following errors.

An invalid symbol was received in the physical layer of the protocol. In the embodiment shown this is reported by a signal err_sym9b from the channel decoder module.

A CRC error occurs in the data frame (likely caused by a bit flip). In the embodiment shown this type of error is reported by a signal err_crc from the CRC-module 25.

A sequence number error may be reported if the sequence number of a data frame does not logically follow from the sequence number of a previous data frame.

An RX buffer overflow err_buf_overflow may also be a cause for an error message.

The error detection module 26 here functions as the module for signaling an error message. In case an error is detected, the error detection module 26 requests via req_NAC that an error indication message is sent to the transmitter 10. The message req_NAC includes information indicative for the sequence number of the last correctly received data frame. Such indicative information is preferably the sequence number itself of the last correctly received data frame. Alternatively it is for example the sequence number of the first data frame received with errors. This is however not always possible, as the detected errors may not necessarily be associated with a data frame. They can be associated with e.g., a control frame, or an invalided idle symbol.

The receiver 20 in the data processing system further includes a timer 27 that indicates the amount of time lapsed from the moment the error message req_NAC transmission is initiated. After expiry of a predetermined amount of time it provides a signal expire to the error detection module 26. In response to this signal the error detection module 26 initiates a new transmission of an error message. The error detection module 26 further may initiate a resynchronization of the connection to the transmitter with a signal req_link_sync.

Figure 9:
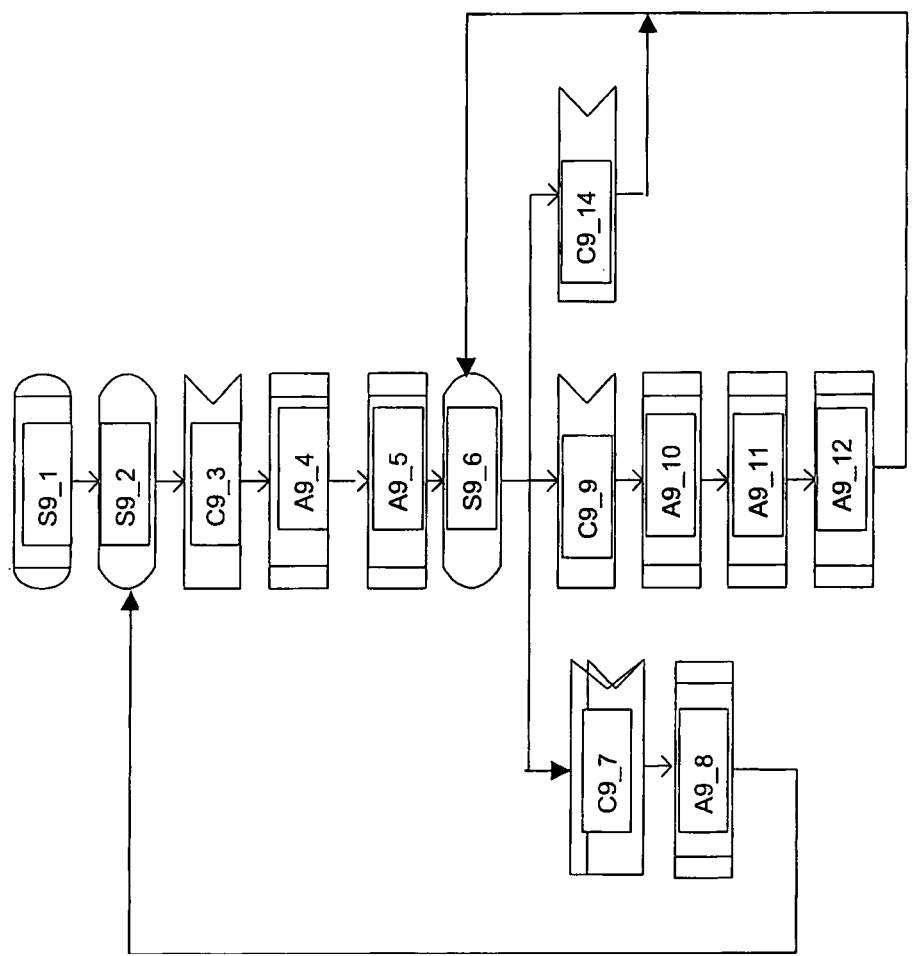
FIG. 9 shows an overview of the operation of the receiver of FIG. 8.

FIG. 9 schematically illustrates a finite state machine for operation of a receiver 20 according to the invention.

In this scheme the oval blocks indicate a state. The indented rectangular blocks indicate a detected condition, and the unindented rectangular blocks indicate an action State S9_1 is the initial state of the receiver 20 after reset. From that state it transfers to state S9_2, which is maintained as long as no errors are detected.

Condition C9_3 implies an error is detected. In that case actions A9_4 and A9_5 are carried out. Action A9_4 is the communication of a message req_NAC to notify the transmitter 10 of the data frame of the sequence number of the last correctly received data frame.

Action A9_5 is starting the timer 27 to measure the waiting time for a response of the transmitter 10 to said message.

State S9_6 is a waiting state wherein the receiver waits for a response of the receiver. During said waiting stage S9_6 the following conditions may occur:

C9_7: The receiver 20 receives a replay of data frames by the transmitter. In that case the timer may optionally be stopped to save power (in action A9_8) and the receiver 20 assumes the no-error state S9_2. The replay detection may consist of detecting a valid data and/or control frame, or detecting the link resynchronization at the physical layer.

C9_9: The timer 27 expires. In this case the actions A9_10, A9_11 and A9_12 are performed. Action A9_10 is a resynchronization of the data link 40 from the receiver 20 to the transmitter 10. This action is followed by action A9_11, which is the transmission of a new negative acknowledgement message which includes a flag to request the data frame transmission link to be resynchronized. As action A9_12 additionally the timer 27 is started again. Following the actions A9_10, A9_11 and A9_12 the receiver 20 assumes the waiting state S9_6, wherein it waits again for the retransmission of data frames by the transmitter 10.

C9_14: Another error is detected. In this case, the no error indication message is further sent to the transmitter to prevent an avalanche of error messages to the transmitter when for example the link is out of sync, and with every symbol an error is likely to be detected. As a result, the receiver 20 returns directly to state S9_6, wherein it waits for a retransmission of data frames or another response of the transmitter.

As indicated by the dashed box in FIG. 8 an error counter 28 may be used, instead of a timer 27 to initiate a second error indication message transmission. When an error indication message is transmitted by the receiver, the error counter is initialized to count the detected errors up to a predetermined value. When this value of errors is reached, the same actions as for the timer expiration are taken (e.g., link resynchronization A9_10 and initiating a second error indication message transmission A9_11), after which the error counter is reinitialized and again set to count detected errors. The error counter may stop counting errors when a response C9_7 from the transmitter is observed.

Figure 10:
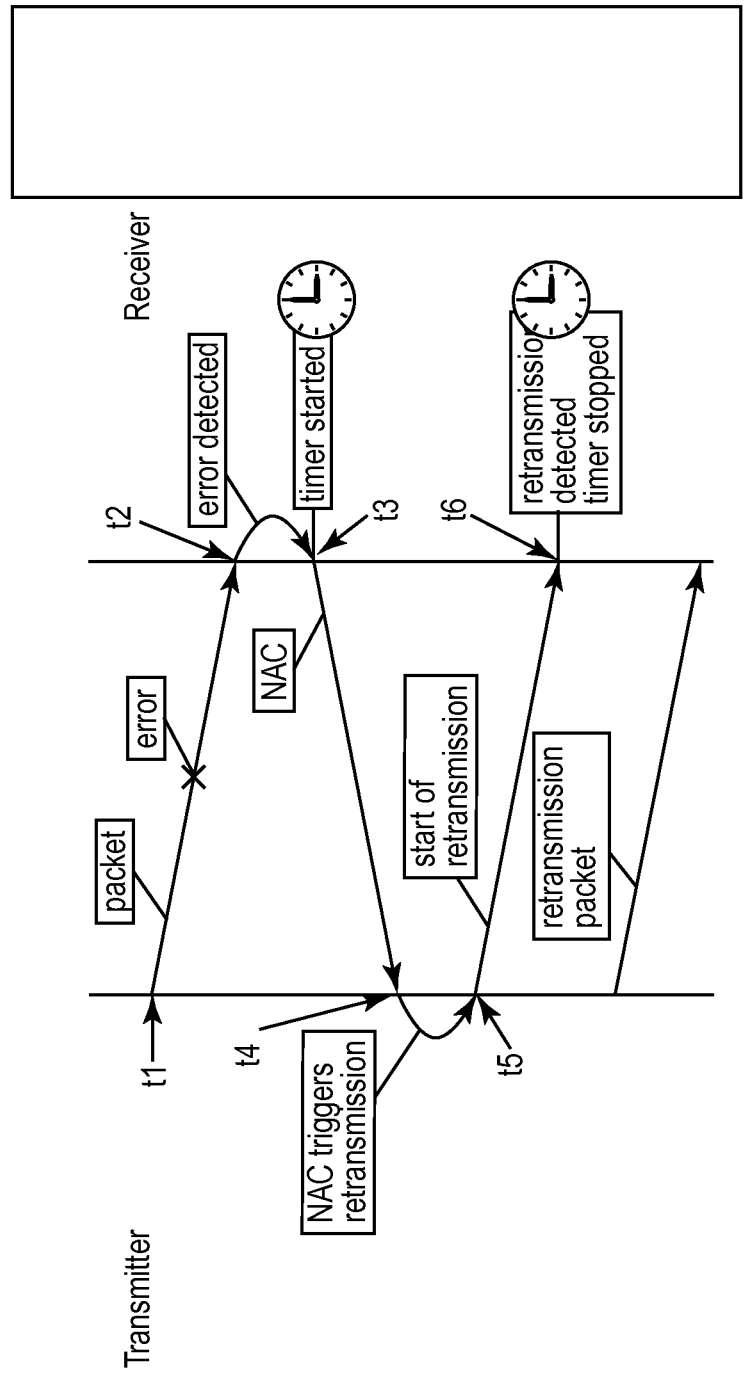
FIG. 10 shows a first example of a retransmission between a transmitter and a receiver in a data processing system according to the invention.

FIG. 10 shows a first example of a communication between a transmitter 10 and a receiver 20 in a data processing system according to the invention.

At time t1 the transmitter 10 transmits a data frame. This data frame is received at time t2 by the receiver 20. In this example the receiver detects that an error occurs in the time interval tl-t2. In response thereto, at time t3, it transmits an error message NAC to notify the transmitter 10 of the data frame of the occurrence of the error. The error message includes at least information relating to the sequence number of the last correctly received data frame. The message is received at time t4 by the transmitter 10, and triggers a retransmission of one or more data frames at time t5. At time t6 the receiver detects the retransmission and stops it the timer.

Figure 11:
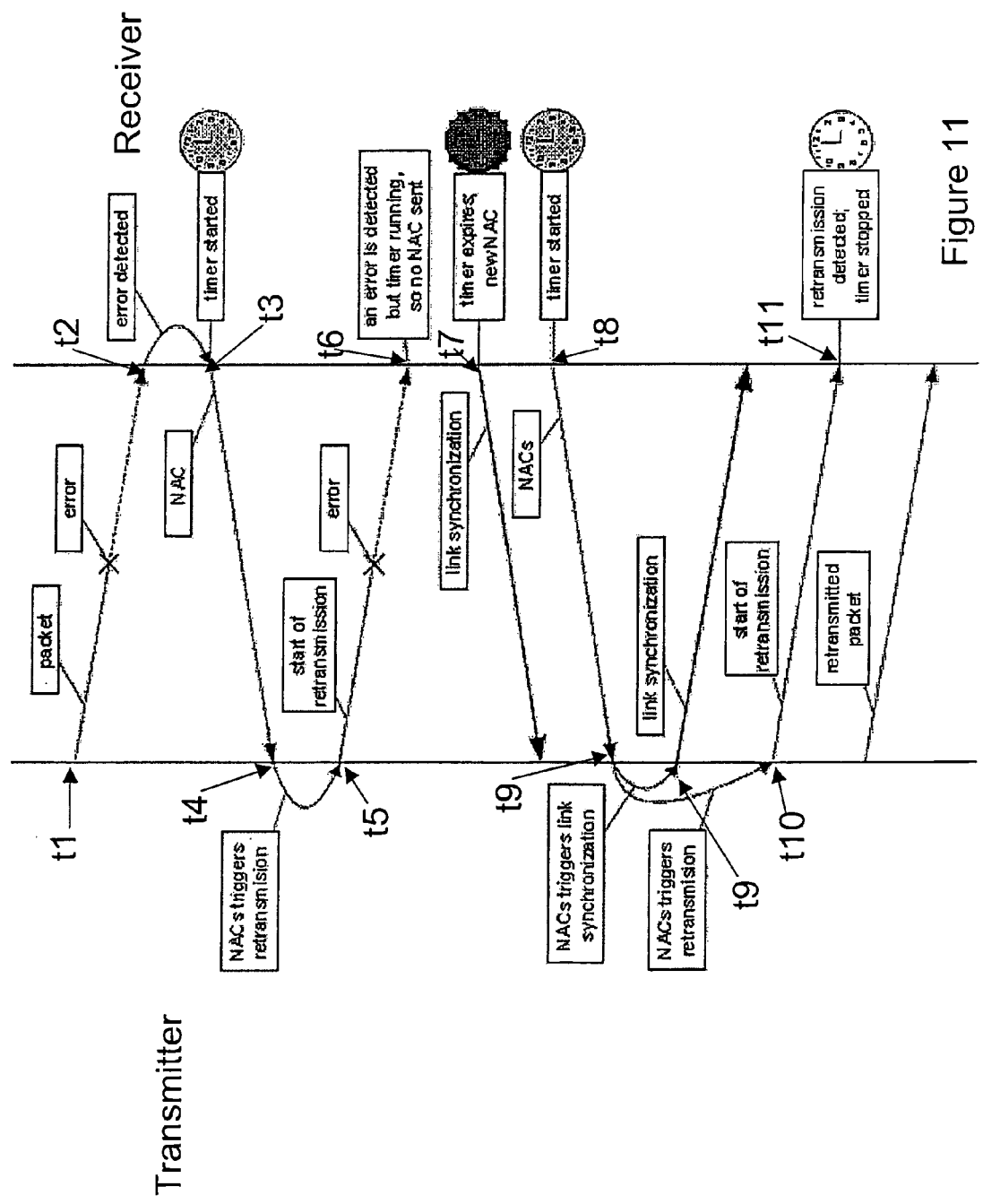
FIG. 11 shows a second example of a retransmission between a transmitter and a receiver in a data processing system according to the invention.

FIG. 11 shows a second example of a communication between a transmitter 10 and a receiver 20 in a data processing system according to the invention. Until time t5 the second example is equivalent to the first one. However, in the example shown, a further error occurred during the transmission of the retransmitted one or more data frames, and an error is detected at t6, however, no error message NAC is reported back to the transmitter 10 as the timer is still running. As soon as the timer expires at t7, the data link 40 from the receiver 20 to the transmitter 10 is synchronized.

Alternatively, immediate resynchronization upon detection of the error is an option. However, the bit error rates are expected to be much higher (e.g., once every second) than the synchronization error rates (e.g., once every hour). The link resynchronization is only needed for synchronization errors, not for bit errors. As a result, usually the system will recover from the error without link resynchronization (see FIG. 10), and, therefore, there is no need to resynchronize the link with the first error detection. However, in the more rare cases that the system was not able to recover from error after the timer expires, it can be assumed that the link is out of sync and it may be resynchronized immediately.

After synchronization of the data link 40 at time t8 the receiver 20 transmits a new error message. This error message is received at t9 by the transmitter 10. In response thereto the transmitter first synchronizes the data link 30 from the transmitter 10 to the receiver 20, and subsequently at time t10 retransmits one or more data frames. At time t11 the receiver 20 notices that the retransmission is started, and stops its timer 27.

It is remarked that the scope of protection of the invention is not restricted to the embodiments described herein. Parts of the system may implemented in hardware, software or a combination thereof. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A method for transmitting data, the method comprising:
   Producing at least one data frame for transmission, the data frame at least including user data and a sequence number,
   transmitting the data frame by means of a transmitter to a receiver via data link and saving a copy of the data frame in a retransmission buffer which is included In the transmitter, and if saving a copy requires that data already present in the retransmission buffer is overwritten, selecting the one or more of the oldest data frames in the retransmission buffer to be overwritten,
   in case an error is detected at the receiver, communicating an error message to the transmitter of the data frame, which error message at least comprises an indication of the sequence number of the last correctly received data frame,
   upon receipt of such message and if available, retransmitting all the data frames from the retransmission buffer having a sequence number higher than the sequence number indicated in the error message, the retransmitted frames being retransmitted in the order of their sequence numbers.

2. The method according to claim 1, in which a type of error detectable by the receiver is a buffer overflow at the receiver.

3. The method according to claim 1, further comprising sending a second error message if no response is received from the transmitter in reply to the error message within a predetermined time interval and/or after a predetermined number of errors is further detected.

4. The method to claim 3, characterized in that the received response is a retransmission of a data frame, a transmission of a control frame and/or the detection of the link resynchronization.

5. The method according to claim 1, characterized in that dependent on error indications of the step of error detection a resynchronization of a data link for transmitting error messages is initiated.

6. The method according to claim 5, characterized in that resynchronization is initiated after an error is detected by the receiver and before transmission of the first error message.

7. The method according to claim 5 characterized in that if no response is received from the transmitter in reply to the error message within a predetermined time interval and/or before a predetermined number of errors is further detected, resynchronization is initiated before sending the second error message.

8. The method according to claim 1, characterized in that dependent on the error indications obtained from the step of error detection, a resynchronization of a data link for transmitting the at least one data frame is initiated.

9. The method according to claim 8, characterized in that resynchronization of the data link for transmitting the at least one data frame is initiated when sending the first error message.

10. The method according to claim 8, characterized in that resynchronization of the data link for transmitting the at least one data frame is initiated when sending the second error message.

11. The method according to claim 1, characterized by the absence of flow control messages from the receiver.

12. The method according to claim 1, characterized by the absence of acknowledgment messages from the receiver.

13. The method according to claim 11, characterized in that data frames not acceptable to the receiver are dropped.

14. The method according to claim 11, characterized in that data frames that are not acceptable to the receiver are data frames for which the receiver has insufficient storage space.

15. A transmitter comprising:
   a production module operative to produce at least one new data frame for transmission, the at least one data frame including a sequence number (FS) and user data (PL),
   a retransmission buffer operative to temporarily store the at least one new data frame, and having a controller that selects storage space for the at least one new data frame within the retransmission buffer, which controller if no free space is available in the retransmission buffer selects one or more of the oldest data frames in the retransmission buffer to be overwritten by the at least one data frame, and
   wherein outputs of the production module and of the retransmission buffer are coupled to a multiplexor, controlled by the controller to select one of the outputs for providing a data frame for transmission to the receiver.

16. The transmitter according to claim 15, further comprising a selection device, for selecting a data frame for transmission, the selection being made from the at least one data frame and a data frame stored in the retransmission buffer.

17. A data processing system comprising a transmitter according to claim 15, and further comprising a receiver comprising:
- an input for receiving the at least one data frame,
- an error detection module for detecting an error in the at least one data frame,
- a module for signaling an error message, which module in case an error is detected, communicates an error message (req_NAC) to notify the transmitter of the data frame, the message including information indicative for the sequence number of the last correctly received data frame.

18. The data processing system according to claim 17, further characterized by a timer that indicates the amount of time elapsed from the moment of the transmission of the error message, and in that the error detection module initiates a new transmission of an error message after a predetermined amount of time is signaled by the timer.

19. The data processing system according to claim 17, further characterized by a counter that counts the number of errors detected from the moment of the transmission of the error message, and in that the error detection module initiates a new transmission of an error message after a predetermined number of errors is counted by the counter.

* * * * *